United States Patent Office 3,507,629
Patented Apr. 21, 1970

3,507,629
EXTRACTION OF ALUMINUM FROM SILICATE ROCKS AND MINERALS CONTAINING ALUMINUM
Henry G. Iverson, Reno, and Harold Leitch, Boulder City, Nev., assignors to the United States of America as represented by the Secretary of the Interior
No Drawing. Filed Feb. 10, 1966, Ser. No. 529,170
Int. Cl. B01d 9/02, 11/02; C01j 7/00
U.S. Cl. 23—299         13 Claims

ABSTRACT OF THE DISCLOSURE

Almost complete recoveries of alumina are obtained from various types of aluminum silicate materials having relatively narrow ranges of silica/base ratios by melting, quenching, and leaching in dilute acid solutions.

---

This invention resulted from work done by the Bureau of Mines of the Department of the Interior, and the domestic title to the invention is in the Government.

This invention relates to the extraction of aluminum from aluminum-bearing siliceous materials.

As used in the specification and claims, the phrase "aluminum-bearing siliceous materials" includes aluminum silicate compounds, minerals and mixtures, and mixtures of silica or silica compounds with aluminum-bearing minerals, compounds and mixtures.

Although the United States has vast low grade resources of aluminum in the form of anorthosite and other aluminum-bearing siliceous materials including clays, kyanite and sillimanite, it is dependent on foreign resources of aluminum ore in the form of high grade bauxite for over 80 percent of its aluminum production. Lack of economic processes for treating the low grade resources prohibits the industrial use of these sources.

An object of this invention is to provide a reliable and economical procedure to recover virtually all of the aluminum contained in aluminum-bearing siliceous materials in a solid chemical form that can be readily converted to alumina ($Al_2O_3$).

A further object is to provide a procedure for preparing these materials in a highly fractured, friable condition.

It has now been discovered that the relatively insoluble aluminum values in these siliceous materials may readily be leached from the materials with hot sulfuric acid solutions after forming these materials as amorphous solids by completly melting and quenching.

Further objects and advantages will be had from the following description of the process.

Raw materials such as albite, anorthite, anorthosite, and mixtures thereof are first crushed to a size that is suitable for melting. Except as the variations in size may affect the combined cost of crushing and melting, the particle size is not important. A particle size of 4-mesh is suitable for the purposes of the invention. Crushed material is then placed in an unreactive container such as a graphite crucible and completely melted in, for example, an induction, arc or fuel-fired furnace capable of reaching 1700° C. One method for achieving a completely molten and chemically homogeneous liquid mass, but not necessarily the only way, is to increase the temperature of the melt 50° to 100° C. after the disappearance of any unmelted material, and to maintain the molten mass at the increased temperature for 5 minutes. Melting temperatures and the time held in the molten state will obviously vary from one raw material to another. The molten mass is then rapidly cooled or quenched by, for example, pouring it into a pool of water large enough to cover all the quenched solids or by pouring onto a steel or iron plate exposed to air or by exposing the molten material to steam at about 80 p.s.i.g.—or in any other manner whereby the molten material is solidified almost instantly and rapidly cooled thereafter. Provided the cooling rate is rapid enough to produce solids of amorphous (non-crystalline) structure, the manner of quenching is not critical. Water quenching is preferred since it yields a highly fractured, friable mass that is easily handled and readily pulverized.

Quenched, cool solid is then ground or pulverized, and leached with a hot-to-boiling acid solution. Particle sizes of 35-mesh or coarser may suffice for high aluminum value extractions, but 65-mesh or finer sizes are more advantageous for fast extractions. Although other inorganic acids such as nitric acid and hydrochloric acid may be employed, dilute sulfuric acid is the best leaching medium for the particles. For example, extraction with hydrochloric acid results in the dissolution of calcium that is contained in most raw materials which must be removed before the desired aluminum compounds can be precipitated from the pregnant leach solution. When using sulfuric acid supplied in such a quantity so that 1.26 to 1.68 grams of acid are present per gram of solid, an 8 to 16⅔ volume percent acid solution is sufficient. Contact times of 15 to 30 minutes with such as acid solution will leach out 95 to 99 percent of the contained aluminum. Longer contact times and higher acid strengths each alone or taken together decrease the $SiO_2$ and CaO content is the pregnant solution.

After leaching, the pregnant solution is readily separated from the solid residue by the usual thickening and filtering procedure (e.g. the addition of settling agents such as hide glue or starch); decantation of clear pregnant solution; filtration of remaining thickened slurry; and washing of the filter cake with water to remove entrained solution.

Aluminum compounds can be separated from clear pregnant leach solution by evaporation of the solvent or chemical precipitation. Although chemical precipitation by, for example, neutralization may be employed, most of the low grade aluminum-bearing siliceous materials when leached with sulfuric acid yield a clear leach solution which, when subjected to autoclaving under various temperatures and pressures, precipitates out a sodium aluminum sulfate having the approximate formula $NaAl_3(SO_4)_2 \cdot (OH)_6$, the precipitate being readily filtered and water washed. This sulfate can be easily converted to the valuable compound alumina.

An important aspect of the process resides in the $SiO_2$:CaO weight ratio in the raw charge material. A ratio of 3:1 to 8:1 and preferably within 4:1 to 6:1 is necessary to the high extraction of aluminum and to the formation of slurries that can be readily separated into residual solids and clear pregnant solutions, from which aluminum, in the form of compounds, can subsequently be recovered. Although many raw materials inherently contain the desired ratio, silicate- or CaO-containing materials must be added to some charges.

The following examples illustrate ways in which the principle of the invention has been applied, but not to be construed as limiting its scope.

| Feed material | Analysis, percent | | | | |
|---|---|---|---|---|---|
| | $Al_2O_3$ | $SiO_2$ | $Na_2O$ | CaO | $Fe_2O_3$ |
| California anorthosite | 28 | 53 | 10 | 6 | 2.3 |
| Wyoming anorthosite | 29 | 52 | 12 | 4 | 2.5 |
| Minnesota anorthosite | 32 | 48 | 15 | 3 | 1.9 |
| New York anorthosite | 26 | 53 | 11 | 5 | 1.5 |

| Test | Materials melted | | | $Al_2O_3$ extracted, pct. | Pregnant solution impurities, g./100 g. $Al_2O_3$ | | |
|---|---|---|---|---|---|---|---|
| | Anorthosite | $SiO_2$ added, wt. pct. | $SiO_2$:CaO wt. ratio | | $SiO_2$ | $Fe_2O_3$ | CaO |
| 1 | Calif | 0 | 5.3 | 99 | 2.6 | 1.5 | 3.3 |
| 2 | N.Y. | 0 | 7.9 | 97 | 1.5 | 4.1 | (1) |
| 3 | Wyom | 0 | 4.3 | 99 | 8.9 | 4.4 | 3.9 |
| 4 | Wyom | 10 | 5.3 | 96 | .7 | 3.8 | 6.4 |
| 5 | Minn | 0 | 3.2 | (2) | (2) | (2) | (2) |
| 6 | Minn | 10 | 3.9 | 95 | 10.6 | 1.8 | 3.8 |
| 7 | Minn | 12.5 | 4.1 | 89 | 3.3 | 3.4 | 4.4 |
| 8 | Minn | 15.0 | 4.4 | 86 | 1.9 | 4.4 | 5.6 |

1 Not analyzed.
2 Slurry gelled, no analysis possible.

EXAMPLE 1

Leaching of melted and quenched albite and anorthite minerals and mixtures

Albite and anorthite, and mixtures of these minerals, were melted and the molten masses were quenched in water. 50 gram samples of the melted and quenched products ground to minus 65-mesh were leached open to air with 288 ml. of 16 volume percent sulfuric acid at 90° C. to boiling temperatures for 15 minutes, using about 1.68 grams of sulfuric acid per gram of solids and the following results obtained:

| Test | Material melted | | | $Al_2O_3$ extracted, pct. | Pregnant solution impurities, g./100 g. $Al_2O_3$ | | |
|---|---|---|---|---|---|---|---|
| | Albite, wt. pct. | Anorthite, wt. pct. | $SiO_2$:CaO wt. ratio | | $SiO_2$ | $Fe_2O_3$ | CaO |
| 1 | 100 | 0 | 304 | 2.0 | (1) | (1) | (1) |
| 2 | 67 | 33 | 9.8 | 2.6 | 1.64 | 34.4 | (1) |
| 3 | 60 | 40 | 7.9 | 97.0 | 1.47 | 4.08 | (1) |
| 4 | 50 | 50 | 6.2 | 92.0 | .37 | 3.59 | (1) |
| 5 | 20 | 80 | 3.4 | 99.3 | 20.4 | 17.0 | (1) |
| 6 | 0 | 100 | 2.5 | (2) | (2) | (2) | (2) |

1 Not analyzed.
2 Slurry gelled, no analysis possible.

EXAMPLE 2

Leaching of melted and water-quenched anorthosite

Samples of California, Wyoming, Minnesota and New York anorthosite of various chemical compositions were melted, quenched, ground, and leached under the same conditions as in Example 1. Silica ($SiO_2$) was added to Wyoming and Minnesota anorthosites before melting. The results are shown below:

EXAMPLE 3

Effect of leach variables

The effects of sulfuric acid concentration, weight ratio of acid to feed, time, temperature, and size of feed solids on leaching melted and water-quenched California anorthosite having the composition set forth in Example 2 are shown below:

| Test | Run | Particle mesh size | Leach solution temp., ° C. | Acid concentration, pct. | Grams $H_2SO_4$ per gram anorthosite feed | Leach time, hrs. | $Al_2O_3$ extracted, pct. | Pregnant solution impurities, g./100 g. $Al_2O_3$ | | |
|---|---|---|---|---|---|---|---|---|---|---|
| | | | | | | | | $SiO_2$ | $Fe_2O_3$ | CaO |
| A | 1 | −65 | 100 | 4 | 1.12 | .25 | 75 | 6.5 | 1.4 | 10.1 |
| | 2 | −65 | 100 | 16 | 1.12 | .25 | 99 | 3.4 | 1.2 | (1) |
| B | 3 | −65 | 100 | 16 | 1.21 | .25 | 93 | 3.4 | 1.2 | (1) |
| | 4 | −65 | 100 | 16 | 2.24 | .25 | 99 | 2.9 | 2.0 | 6.1 |
| C | 5 | −65 | 100 | 16 | 1.12 | .25 | 93 | 3.4 | 1.2 | (1) |
| | 6 | −65 | 100 | 16 | 1.12 | .5 | 96 | 1.5 | .8 | (1) |
| | 7 | −65 | 100 | 16 | 1.12 | 4.0 | 95 | .5 | 1.3 | (1) |
| D | 8 | −65 | 30 | 16 | 2.24 | 1.0 | 6 | (1) | (1) | (1) |
| | 9 | −65 | 50 | 16 | 2.24 | 1.0 | 44 | 4.2 | 3.6 | 8.1 |
| | 10 | −65 | 70 | 16 | 2.24 | 1.0 | 89 | .4 | 2.3 | 4.0 |
| | 11 | −65 | 100 | 16 | 2.24 | 1.0 | 99 | .2 | 2.5 | 5.0 |
| E | 12 | −6 | 100 | 16 | 1.68 | 1.0 | 67 | .1 | 1.6 | 6.7 |
| | 13 | −20 | 100 | 16 | 1.68 | 1.0 | 91 | .1 | 1.7 | 3.7 |
| | 14 | −65 | 100 | 16 | 1.68 | 1.0 | 99 | .9 | 1.8 | (1) |

1 Not analyzed.

As can be seen from tests A, B and D, respectively, aluminum-value extraction varies with the acid concentration, the acid-to-feed ratio and leach solution temperature. Test E shows that more aluminum values can be extracted the smaller the ore particle size. In regard to leaching time, as shown in test C, maximum leaching appears to be achieved at the end of one-half hour.

EXAMPLE 4

The effect of leaching time on the impurities present in the resultant leach liquor are shown below. California anorthosite having the composition set forth in Example 2 and with a mesh size of −65 was the solid feed. A 16% by volumn sulfuric acid leach solution was employed and leaching was carried out at the boiling point of the solution.

| Time hours | Ratio g. H₂SO₄ per g. feed | Al₂O₃ extracted, percent | Impurities in pregnant solution, grams per 100 grams Al₂O₃ | |
|---|---|---|---|---|
| | | | SiO₂ | CaO |
| 0.25 | 2.24 | 99.2 | 2.92 | 6.13 |
| 1.0 | 2.24 | 99.6 | .20 | 5.02 |
| 4.0 | 2.24 | 98.6 | .10 | 2.73 |
| 1.0 | 2.24 | 99.6 | .20 | 5.02 |
| 4.0 | 2.24 | 99.6 | .10 | 2.20 |
| .25 | 1.68 | 99.6 | 2.64 | 3.32 |
| 0.25 | 2.24 | 99.2 | 2.92 | 6.13 |
| 1.0 | 2.24 | 99.6 | .20 | 5.02 |
| 4.0 | 2.24 | 98.6 | .10 | 2.73 |
| 1.0 | 2.24 | 99.6 | .20 | 5.02 |
| 4.0 | 2.24 | 99.6 | .10 | 2.20 |
| .25 | 1.68 | 99.6 | 2.64 | 3.32 |
| 16.0 | 1.68 | 99.6 | .29 | 1.02 |
| .25 | 2.24 | 99.2 | 2.92 | 6.13 |
| 4.0 | 2.24 | 99.6 | .20 | 2.39 |

The above table shows that after the maximum amount of Al₂O₃ has been extracted from the raw material, continued contact of the material with the leaching medium reduces the amount of CaO and SiO₂ in the pregnant leach liquor, thereby providing the Al₂O₃ in a more desirable state in the leach liquor.

EXAMPLE 5

Leaching of mixed compounds

Silica, alumina and calcium oxide were mixed together, subsequently melted and quenched.

The quenched products were ground to minus 65-mesh and leached at 90° C. to the boiling point for 30 minutes with 16% sulfuric acid solution using about 1.68 grams of $H_2SO_4$ per gram of feed. The results are given in the table below.

| Material leached, chemical analysis, wt. percent | | | Wt. ratio, SiO₂:CaO | Al₂O₃ extracted, percent |
|---|---|---|---|---|
| Al₂O₃ | SiO₂ | CaO | | |
| 29.6 | 54.6 | 13.4 | 4.1 | 9.5 |
| 30.0 | 52.8 | 15.4 | 3.4 | 63.0 |
| 30.0 | 52.6 | 17.4 | 2.5 | (¹) |
| 38.9 | 48.4 | 10.7 | 4.5 | 71.0 |
| 39.5 | 46.9 | 11.7 | 4.0 | 96.6 |
| 39.3 | 44.1 | 14.4 | 3.1 | (¹) |
| 48.1 | 40.8 | 8.9 | 4.6 | 56.9 |
| 48.8 | 39.0 | 9.7 | 4.0 | 73.3 |
| 48.4 | 38.3 | 10.5 | 3.6 | (¹) |

¹ Gelled—could not filter.

Example 5 illustrates that aluminum extraction by the process of this invention is not limited to specific minerals, but is equally applicable to chemical compounds and mixtures of the same. Furthermore, the process is not necessarily dependent on the physical state (including, but not limited to crystal structure, molecular arrangement and purity) of the feed material. Since the charges are completely melted, the nature of the aluminum bearing constituents, whether crystalline or amorphous or whether present as one chemical compound or as several individual compounds, is not significant provided the combined chemical analysis conforms to the desired SiO₂ to CaO weight ratio. Therefore, not only is the process applicable to minerals and mixtures of minerals such as anorthosite, albite and anorthite, but may also be employed with materials such as siliceous bauxite, kyanite, silliminate, kaolin and other clays, chemical or physical mixtures of alumina, silica and calcium oxide. Alkali metal oxides or silicates can be present in the raw materials and do not deleteriously affect the process.

By forming the raw material as an amorphous solid through complete melting and quenching, an intermediate product is arried at that is easily handled, crushed and leached of aluminum. The pregnant leach solution can then be readily separated from solid residue, and the aluminum easily precipitated from the solution in highly desirable form.

Although the particular process is well adapted to carry out the objects of the present invention, it is to be understood that various modifications and changes may be made all coming within the scope of the following claims.

What is claimed is:

1. A process for separating aluminum values from a particulate, aluminum-bearing material containing in physical or chemical admixture SiO₂ and CaO which comprises adjusting the proportions of SiO₂ and CaO to obtain a ratio of about 3 to about 8 parts by weight of SiO₂ to 1 part by weight of CaO, completely melting said material to form a fluent liquid, quenching and cooling said melted material at a rate sufficiently rapid to form amorphous solid material and to prevent formation of crystalline solids therein, leaching aluminum values from said solid material with a hot-to-boiling relatively dilute acid solution, said acid being chosen from the group consisting of sulfuric, hydrochloric and nitric acids, separating pregnant leach solution from solid residue, and precipitating an aluminum compound from said separated pregnant leach solution.

2. The process of claim 1 wherein said aluminum-bearing material contains from about 4 to about 6 parts by weight of SiO₂ to 1 part by weight of CaO.

3. The process of claim 1 wherein said aluminum-bearing material also contains Na₂O and wherein said material contains more than about 3 parts by weight of SiO₂ to 1 part by weight of CaO plus Na₂O.

4. The process of claim 3 wherein said acid solution comprises sulfuric acid solution.

5. The process of claim 4 wherein said precipitation step comprises autoclaving said separated pregnant leach solution to precipitate therefrom a basic sodium aluminum sulfate having the approximate formula $$NaAl_3(SO_4)_2 \cdot (OH)_6$$

6. The process of claim 5 wherein said amorphous solid material of claim 1 is pulverized to minus 65 mesh before being leached.

7. The process of claim 4 wherein said amorphous solid material is contacted with said acid solution for a period of time substantially longer than that required to dissolve a maximum amount of the aluminum values present in the aluminum-bearing siliceous material whereby the SiO₂ and CaO contents of the pregnant acid solution are reduced below the respective amounts of SiO₂ and CaO present in the pregnant acid solution at the time maximum aluminum dissolution was initially achieved.

8. A process for separating aluminum values from particulate, aluminum-bearing siliceous material comprising establishing a SiO₂:CaO weight ratio in the said material of from 3:1 to 8:1, completely melting said material to form a fluent liquid, completely quenching and cooling said melted material at a rate sufficiently rapid to prevent formation of crystalline solids therein and to form an amorphous solid material therefrom, leaching aluminum values from said solid material with a hot-to-boiling relatively dilute acid solution, said acid being chosen from the group consisting of sulfuric, hydrochloric and nitric acids, separating pregnant leach solution from solid residue, and precipitating an aluminum compound from said separated prenant leach solution.

9. The process of claim 8 wherein said material is selected from the group consisting of albite, anorthite, anorthosie, kyanite, bauxite, sillimanite, and aluminum-bearing clays.

10. The process of claim 9 wherein said amorphous solid material is contacted with said acid solution for a period of time substantially longer than that required to dissolve a maximum amount of the aluminum values present in the aluminum-bearing silicious material whereby the SiO₂ and CaO contents of the pregnant acid solution are reduced below the respective amounts of SiO₂ and CaO present in the pregnant acid solution at the time maximum aluminum dissolution was initially achieved.

11. The process of claim 8 wherein the $SiO_2:CaO$ ratio is established at from 4:1 to 6:1.

9. The process of claim 8 wherein said material is selected from the group consisting of albite, anorthite, anorthosite, kyanite, bauxite, sillimanite, and aluminum-bearing clays.

12. The process of claim 11 wherein said acid solution comprises a sulfuric acid solution.

13. The process of claim 12 wherein said amorphous solid material is pulverized to minus 65 mesh before being leached.

References Cited

UNITED STATES PATENTS

| | | | |
|---|---|---|---|
| 2,243,060 | 5/1941 | Fulda | 23—305 X |
| 2,958,580 | 11/1960 | Lowenstein | 23—123 |
| 3,011,878 | 12/1961 | Lackey | 23—123 X |
| 3,116,973 | 1/1964 | Haden | 23—123 X |
| 3,143,392 | 8/1964 | Laeman | 23—123 |
| 3,216,792 | 11/1965 | Udy | 23—123 |
| 3,226,189 | 12/1965 | Bretsznajder | 23—123 |

FOREIGN PATENTS

| | | |
|---|---|---|
| 223,794 | 9/1959 | Australia. |
| 937,328 | 9/1963 | Great Britain. |
| 1,159,419 | 12/1963 | Germany. |

NORMAN YUDKOFF, Primary Examiner

S. J. EMERY, Assistant Examiner

U.S. Cl. X.R.

23—308, 312, 302, 305, 123